(12) United States Patent
Zhang

(10) Patent No.: US 7,680,954 B2
(45) Date of Patent: Mar. 16, 2010

(54) PROXY DNS FOR WEB BROWSER REQUEST REDIRECTION IN PUBLIC HOTSPOT ACCESSES

(75) Inventor: Junbiao Zhang, Bridgewater, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 20 days.

(21) Appl. No.: 10/592,885

(22) PCT Filed: Mar. 16, 2004

(86) PCT No.: PCT/US2004/008000

§ 371 (c)(1),
(2), (4) Date: Sep. 15, 2006

(87) PCT Pub. No.: WO2005/096160

PCT Pub. Date: Oct. 13, 2005

(65) Prior Publication Data

US 2007/0204051 A1 Aug. 30, 2007

(51) Int. Cl.
*G06F 15/16* (2006.01)
(52) U.S. Cl. .................................................. 709/245
(58) Field of Classification Search ................. 709/245
See application file for complete search history.

(56) References Cited

U.S. PATENT DOCUMENTS

| 6,324,585 | B1 | 11/2001 | Zhang et al. | |
|---|---|---|---|---|
| 6,425,003 | B1 | 7/2002 | Herzog et al. | |
| 6,480,508 | B1 * | 11/2002 | Mwikalo et al. | 370/475 |
| 7,003,555 | B1 * | 2/2006 | Jungck | 709/219 |
| 7,284,056 | B2 * | 10/2007 | Ramig | 709/227 |
| 2002/0027915 | A1 * | 3/2002 | Foti et al. | 370/392 |
| 2002/0112076 | A1 * | 8/2002 | Rueda et al. | 709/245 |
| 2005/0066041 | A1 * | 3/2005 | Chin et al. | 709/228 |

OTHER PUBLICATIONS

Search Report Dated Mar. 17, 2005.

* cited by examiner

*Primary Examiner*—Shawki S Ismail
*Assistant Examiner*—Esther Benoit
(74) *Attorney, Agent, or Firm*—Robert D. Shedd; Harvey D. Fried; Joel M. Fogelson

(57) ABSTRACT

There is provided a system for resolving a proxy server name for a web browser request issued by a user device in a network. The user device has a browser configured with the proxy server name. The system includes a Domain Name System (DNS) server and a web server. The DNS server generates a private Internet Protocol (IP) address associated with the user device in response to a non-resolvable DNS query from the user device that specifies the proxy server name, and creates a one-to-one mapping that relates the private IP address to the proxy server name. The web server receives a web browser request from the user device. The web browser request has been redirected to the web server and has an original destination IP address equal to the private IP address. The web server identifies the proxy server name from the private IP address using the one-to-one mapping.

13 Claims, 3 Drawing Sheets

PROXY DNS FOR WEB BROWSER REQUEST REDIRECTION IN PUBLIC HOTSPOT ACCESSES

This application claims the benefit, under 35 U.S.C. §365 of International Application PCT/US2004/008000, filed Mar. 16, 2004, which was published in accordance with PCT Article 21(2) on Oct. 13, 2005 in English.

FIELD OF THE INVENTION

The present invention generally relates to mobile communications and, more particularly, to a proxy Domain Name System (DNS) and method for web browser redirection public hotspot accesses.

BACKGROUND OF THE INVENTION

Public hotspot access points have recently become extremely popular. One of the key requirements in using access points is seamlessness, i.e., the hotspot should accommodate the communication settings on user machines as much as possible without user intervention in changing such settings. One particular problem to the user of hotspots requires that a hotspot accommodate whatever browser settings a user may have on a machine. For example, a business traveler's browser is likely to have a proxy server configuration. When the business traveler is using a hotspot, the proxy server name cannot be resolved because the domain name is not recognized in a registry and the browser shows a failure page preventing the traveler from accessing the Internet or a remote computer.

A further problematic scenario occurs when a user takes his office laptop to a public hotspot and starts browsing the web. The browser on the laptop is configured with a proxy server name that is not resolvable outside of the user's company intranet. Because of the proxy configuration, for any web page the user tries to access, the browser sends a web page request in a special format to the proxy server. But since the proxy server name cannot be resolved into an Internet Protocol (IP) address, the browser would immediately show a failure page to the user. Further, since the hotspot could not even receive the very first browser request, the hotspot could not provide any assistance to the user. The key here is to help the user's machine resolve this proxy server name so that the browser could at least start interacting with the hotspot and the hotspot can seamlessly translate and bridge the requests sent from the user's machine. The problem, however, is that the local Domain Name System (DNS) server in the hotspot does not know what proxy name is configured in the user browser and is, thus, unable to specially treat the DNS query for the proxy name from the user's machine.

One solution to the above problem is to let the local DNS server blindly return local IP addresses for any host names that the local DNS server could not resolve as this, of course, will include the proxy server name on a user machine's browser. The problem with this approach is that the user is confused by the results of such of operation by receiving a web page that was not requested by the user. For example, even if a user types in a wrong server name, which normally should not be resolved, the local DNS server still returns a valid IP address. More importantly, because the hotspot does not know which IP address corresponds to user's proxy server, it is impossible to transparently process the user's browser requests. Thus, the problem of resolving a request for a web page, as described above, still remains.

SUMMARY OF THE INVENTION

According to an aspect of the present invention, there is provided a system and method for resolving a proxy server name for a web browser request issued by a user device in a visited network. A user device has a browser configured with the proxy server name. The system includes a local Domain Name System (DNS) server and a local web server. The local DNS server generates a private Internet Protocol (IP) address associated with the user device in response to a non-resolvable DNS query from the user device that specifies the proxy server name, and creates a one-to-one mapping that relates the private IP address to the proxy server name. The local web server receives a web browser request from the user device. The web browser request has been redirected to the local web server and has an original destination IP address equal to the private IP address. The local web server identifies the proxy server name from the private IP address using the derived one-to-one mapping.

These and other aspects, features and advantages of the present invention will become apparent from the following detailed description of preferred embodiments, which is to be read in connection with the accompanying drawings.

DETAILED DESCRIPTION OF THE INVENTION

The present invention is directed to a system and method for resolving proxy server names for web browser requests issued from user devices at public hotspots access points. It is to be appreciated that the present invention is not limited solely to hotspot access points and, thus, may be employed with respect to other locations and/or entities. That is, the present invention may be employed with respect to any visited network by a user device including, but not limited to, a public hotspot network, a guest service network in an enterprise location, a home network, and so forth.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) that is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

Figure 1:
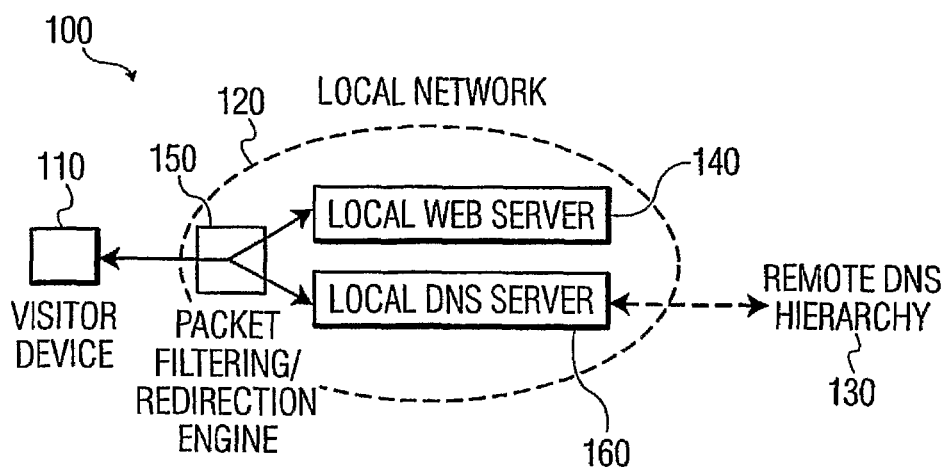
FIG. 1 is a block diagram illustrating a communication system 100 to which the present invention may be applied, according to the principles present invention.

FIG. 1 is a block diagram illustrating a communication system 100 to which the present invention may be applied, according to an illustrative embodiment of the present invention. The communication system 100 forms the basic framework for offering a seamless hotspot access experience in accordance with the present invention. The communication system 100 includes a visitor/user machine 110, a local network 120, and a remote Domain Name System (DNS) hierarchy 130. The local network includes a local web server 140, a packet filtering/redirection engine 150, and a local Domain Name System (DNS) server 160.

The local web server 140 is used to determine whether the browser on the user machine 110 has a proxy setting. Other functions may be integrated into the local web server 140, such as, for example, presenting the user with local welcome pages and serving as a transparent proxy. However, the other functions are not essential to the present invention.

The packet filtering/redirection engine 150 is used to filter user packets for authentication and access control purpose. The packet filtering/redirection engine 150 is also used to redirect packets generated by the user's browser to the local web server 140.

The local DNS server 160 is used to resolve domain names for hotspot users.

A general overview will now be given of the present invention, according to an illustrative embodiment of the present invention. According to the present invention, for any new user (based on the source Internet Protocol (IP) address of DNS queries), before the proxy server setting and name is determined, the local DNS server 160 always returns an IP address for any non-resolvable names. These DNS responses are used to later discover the user browser proxy server name, thus the returned IP addresses should not be used for other purposes. Therefore, the Time-To-Live field in these DNS responses should always be set to 0, causing the user machine not to cache the DNS response. The IP address must be a private IP address that is not used by any machines reachable from the hotspot. Each assigned IP address is unique and has a one-to-one mapping with its corresponding non-resolvable name (i.e., from the IP address, the name can be found). The local DNS server 160 maintains a table of such mappings for each user. This way, the local DNS server 160 can soon find out the user browser's proxy name (if any) with the help of the packet filtering engine and the local web server. After this is determined, the local DNS server 160 can then return a local IP address for the user browser's proxy name (e.g. the local web server's IP address), all other non-resolvable names will be treated in the standard way.

In an illustrative embodiment of the present invention, there is one table for each machine in the hotspot. Each entry in a table corresponds to a bad DNS request sent by the corresponding device. The table is used to later to ascertain the proxy server name that is set in the user's browser. The tables are generated by the local DNS server 160 and maintained locally. The tables are used by both the local DNS server 160 and the local web server 140. It is to be appreciated that while the mapping tables are described herein as one table per user, other variations may also be employed while maintaining the spirit of the present invention. For example, a single table with one entry (or more) per each machine may also be employed.

Figure 2:
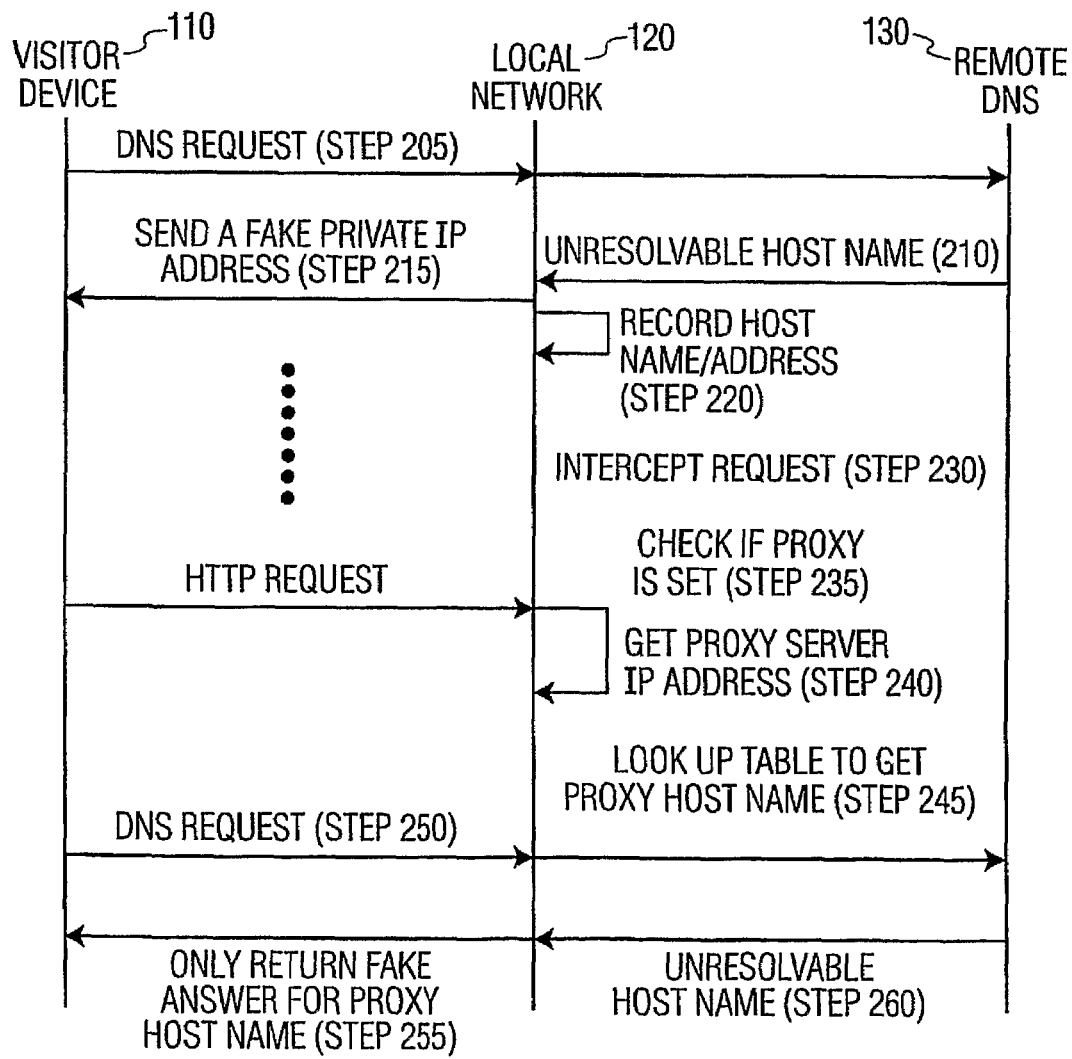
FIG. 2 is a high level flow diagram illustrating a method for redirecting web browser requests in public hotspot access point using a proxy Domain Name System (DNS) server, according to the principles of present invention.

A more detailed description of the present invention will now be given with respect to FIG. 1. FIG. 2 is a high level flow diagram illustrating a method for redirecting web browser requests in public hotspots using a proxy Domain Name System (DNS) server, according to an illustrative embodiment of the present invention. For the purpose of illustration, it is presumed that the user browser has a proxy configuration and the proxy server is set to "indyproxy.tce.com".

At the hotspot, the user's browser first obtains the address of the local DNS server 160 (e.g., through Dynamic Host Configuration Protocol (DHCP). All subsequent domain name resolution requests will be sent to this local DNS server 160. When the user tries to access a web page, the user's browser first tries to resolve the name "indyproxy.tce.com". A DNS request for this name is sent from the visitor machine 110 to the local DNS server 160 (step 205). At this point, the local DNS server 160 does not know that "indyproxy.tce.com" is the proxy server name configured in the user's browser and, since this host name cannot be resolved outside the corresponding company's intranet, "indyproxy.tce.com" is not resolvable by the local DNS server 160 (210). Thus, a unique private IP address sent from the local DNS server 160 to the browser of the visitor machine 110 (step 215). For illustrative purposes, it is presumed that this address is "10.0.0.66". A table having an entry "10.0.0.66 indyproxy.tce.com" is recorded for the user at the local DNS server 160 (step 220).

The user's browser sends out a Hyper Text Transfer Protocol (HTTP) request to "10.0.0.66" (step 225), with the HTTP header including the Uniform Resource Locator (URL) that the user wants to access. This HTTP request is sent to the hotspot network and intercepted by the packet filtering/redirection engine (step 230). The HTTP request is then redirected to the local web server 140 (i.e. the destination IP address of each IP packet carrying the HTTP request is changed to the local web server's IP address) by the packet filtering/redirection engine. The local web server 140 checks the HTTP header (step 235) and determines that this is a request for a proxy server (i.e. sent from a browser with a proxy configuration) because of the special format of the request. The local web server then determines the original destination IP address (10.0.0.66) of the request (step 240). It is to be appreciated that any known technique may be employed to determine the original destination IP address in the case described herein and, thus, the present invention is not limited to any particular technique for determining the same.

Using this address (i.e., the original destination IP address (10.0.0.66) of the request), the local web server looks up the mapping table for the user (based on the source IP address of the HTTP request) generated by and located at the DNS server, and the actual proxy server name "indyproxy.tce.com"

is retrieved there from (step 245). The local DNS server 160 is then notified about this proxy name. The mapping table for the user is then removed from the DNS server.

All subsequent queries for "indyproxy.tce.com" are treated special. That is, only for the DNS request for the non-resolvable proxy server name issued from the visitor device 110 at the hotspot (step 250) is the unique private IP address returned (step 255). For all other non-resolvable host names, the standard error messages are returned to the user (step 260).

In the case that the local web server determines that the user's browser does not have a proxy configuration, the local web server notifies the DNS server to remove the mapping table for that user all together. From that point on, all non-resolvable names will be treated in the standard way.

A description will now be given of the use of denial of service attacks against a system or architecture implementing the present invention. Since the DNS server has to maintain a mapping table of non-resolvable names for each user machine, an attacker can flood the DNS server with known bad names, thus overflowing that space on the server. This problem can be easily solved by limiting the number of entries in each table. If a hacker decides to carry out such kind of attack, the only victim will be himself, i.e. his table will overflow and the entry for his proxy server name may not be in the table when the web server looks up the table. In this way, other users will not be affected by this type of attack.

A description will now be given of other application to which the present invention may be applied, according to various illustrative embodiments of the present invention. From the above description, it is apparent that the aforementioned technique can be applied to other types of applications that may need special treatment for particular DNS names. Different techniques for determining the assigned IP address corresponding to the special domain names may be applied according to the specific application, but the same technique (i.e. assigning unique private IP addresses, maintaining per user mapping table and using the IP address to find out the special domain name) can be used in the DNS server.

Figure 3:
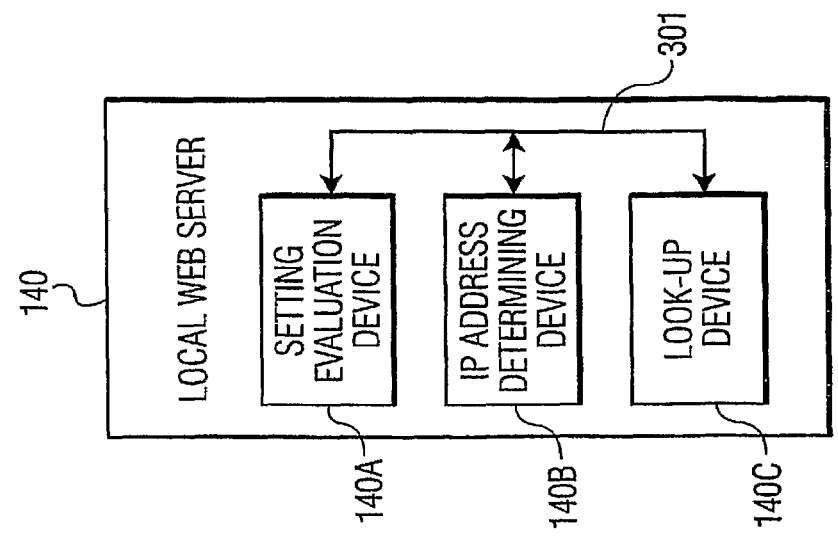
FIG. 3 is a block diagram further illustrating an embodiment of the local web server 140 of FIG. 1, according to an the principles of the present invention.

FIG. 3 is a block diagram further illustrating the local web server 140 of FIG. 1, according to an illustrative embodiment of the present invention. The local web server 140 includes a settings evaluation device 140A, an Internet Protocol (IP) address determining device 140B, and a look-up device 140C, all interconnected via bus 301.

The settings evaluation device 140A determines, from a header of a redirected web browser request issued from the user device 110, whether the browser in the user device 110 has a proxy server configuration.

The Internet Protocol (IP) address determining device 140B determines the original destination IP address of the redirected web browser request. The original destination IP address is the private IP address previously associated with the user device 110 in response to a DNS query from the user device 110.

The look-up device 140C identifies the proxy server name corresponding to the proxy server configuration from the private IP address, using the one-to-one mapping between the private IP address and the proxy server name.

Figure 4:
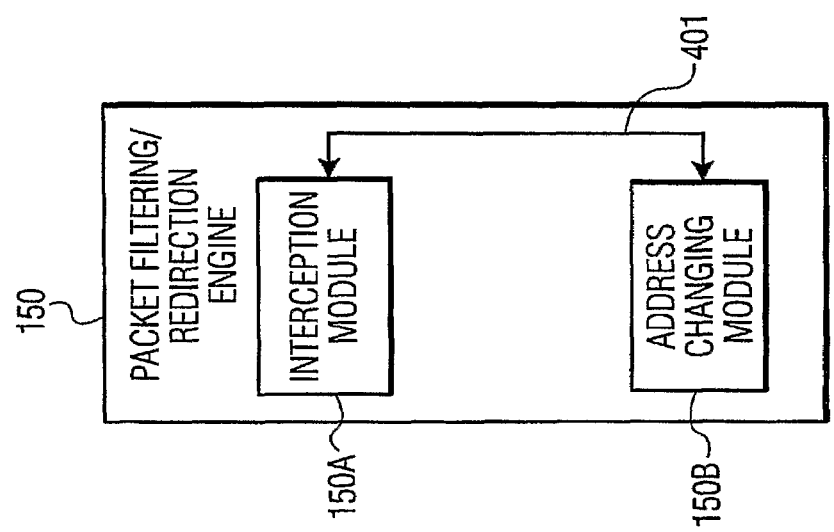
FIG. 4 is a block diagram illustrating an embodiment of the packet filtering/redirection engine 150 of FIG. 1, according to the principles of present invention.

FIG. 4 is a block diagram further illustrating the packet filtering/redirection engine 150 of FIG. 1, according to an illustrative embodiment of the present invention. The packet filtering/redirection engine 150 includes an interception module 150A and an address changing module 150B, all interconnected via bus 401.

The interception module 150A intercepts the web browser request issued by the user device 110. The address changing module 150B changes the destination IP address of the web browser request to the IP address of the local web server.

Figure 5:
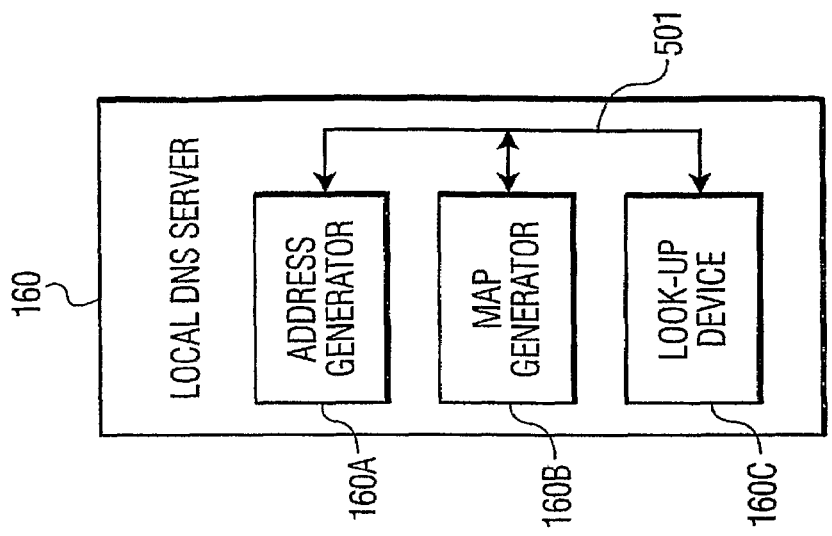
FIG. 5 is a block diagram illustrating an embodiment of the local DNS server 160 of FIG. 1, according to the principles of present invention.

FIG. 5 is a block diagram further illustrating the local DNS server 160 of FIG. 1, according to an illustrative embodiment of the present invention. The local DNS server 160 includes an address generator 160A, a map generator 160B, and a look-up device 160C, all interconnected via bus 501.

The address generator 160A generates the private Internet Protocol (IP) address in response to a DNS query from the user device 110. The map generator 160B creates the one-to-one mapping that relates the private IP address to the proxy server name. The look-up device 160C identifies the proxy server name from the private IP address using the one-to-one mapping, when the web browser request is issued by the user device 110.

Figure 6:
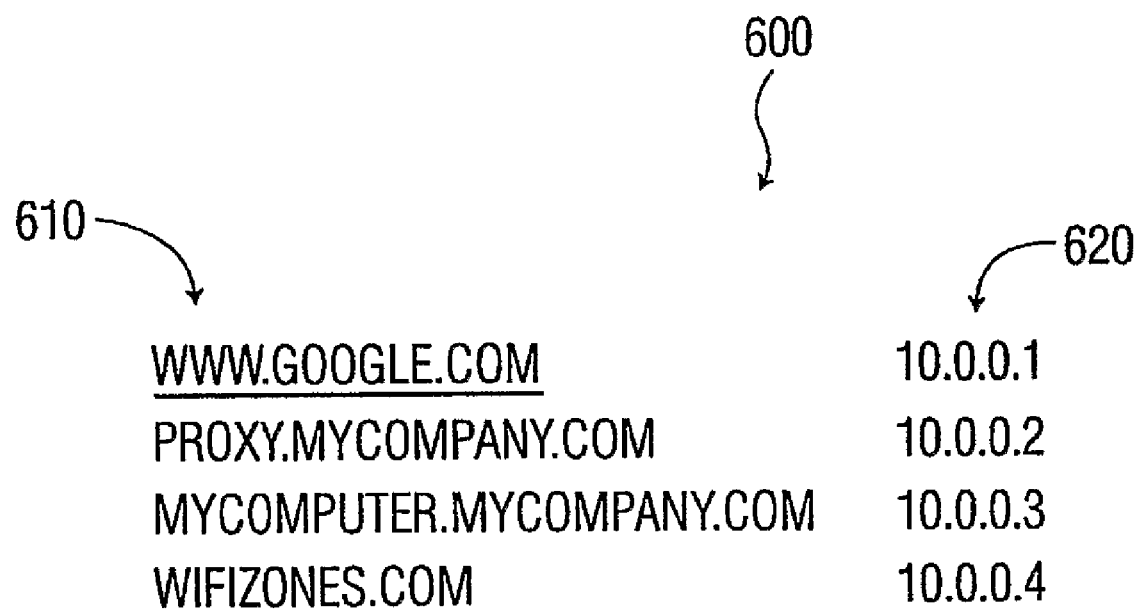
FIG. 6 is a diagram illustrating an embodiment of Domain Name System (DNS) mapping table 600, according to the principles of the present invention.

FIG. 6 is a diagram illustrating an illustrating Domain Name System (DNS) mapping table 600, according to an illustrative embodiment of the present invention. In the illustrative embodiment of FIG. 6, the DNS mapping table 600 is for a user device having an IP address equal to 192.168.1.252. The DNS mapping table 600 includes a one-to-one-mapping between a host name 610 (such as www.thomson.net. www-.dangerkitty.com) and a unique IP address 620 (e.g., 10.0.0.1, 10.0.0.2, 10.0.03, 10.0.0.4, respectively corresponding to a resource obtained at such a host name). As described above, each unique IP address is generated in response to a DNS query that is non-resolvable because it specifies a host name that is unrecognizable or otherwise not capable of being resolved outside of a particular location (e.g., company intranet, etc.). The unique IP address is used at the current location (e.g., public hotspot) of the user device, so that the user can seamlessly interact with the current location as opposed to receiving an error message as would occur in the prior art.

In an optional embodiment of the present invention, the access point to which a user wants to connect with recognizes that the proxy address being used by the user cannot be resolved. The access point queries the user's computer if they want temporarily configure the user's laptop with communication settings used for the hotspot access point. If the user accepts this, the hotspot transmits communications settings that override the configuration of the proxy server. The settings then revert back to the original proxy settings of the computer, when the user disconnects from the proxy server.

One implementation of this optional embodiment creates a new set of commands that help automate the process of setting up a proxy server. These set of commands would be similar to the other commands used for setting up a DHCP connection or used by a browser to retrieve a web page. The first command, known as PROXY STATUS, is transmitted by the hotspot to the user's computer for querying if the user computer is configured to operate with a proxy server. The user computer responds with a PROXY YES command to indicate that the user computer operates in view of a proxy server address.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

The invention claimed is:

1. A method for redirecting web browser requests issued by a user device in a network, the wireless device having a browser configured with a proxy server name and capable of communicating with a DNS server and a web server, the method comprising the steps of:

generating, by the DNS server, a private Internet Protocol (IP) address associated with the user device in response to a non-resolvable DNS query from the user device;

creating, by the DNS server, a one-to-one mapping that relates the private IP address to the proxy server name;

receiving, by the web server, a web browser request from the user device, the web browser request being redirected to the web server and having an original destination IP address equal to the private IP address; and identifying, by the web server, the proxy server name from the private IP address using the one-to-one mapping, wherein said web browser request will only be resolved if said web server determines that said web browser request which is redirected to said private IP address is supposed to be a proxy server request to a server associated with said proxy server name, which is the non-resolved DNS query, for a web page from a second server which is not said server associated with said proxy server name, otherwise said web server will reject said web browser request.

2. The method according to claim 1, further comprising the step of redirecting the web browser request to the web server by changing the original destination IP address to an IP address of the web server.

3. The method according to claim 2, wherein said redirecting step further comprises the step of intercepting the web browser request issued by the user device.

4. The method according to claim 1, wherein said receiving step further comprises the step of determining, from a header of the web browser request issued from the user device, whether the browser in the user device has a proxy server configuration.

5. The method according to claim 1, further comprising the step of identifying, by the DNS server, the proxy server name from the private IP address using the one-to-one mapping.

6. The method according to claim 1, further comprising the step of storing the one-to-one mapping in a table having an entry for each non-resolvable DNS request for a non-resolvable DNS name sent by the user device.

7. The method according to claim 1, wherein each of the DNS server and the web server include a memory device, and said storing step comprises the step of storing the one-to-one mapping in the memory device of at least one of the DNS server and the web server.

8. The method according to claim 1, wherein the network is a public hot spot network.

9. The method according to claim 1, wherein the network is a guest service network in an enterprise.

10. In a Domain Name System (DNS) server, a method for resolving a proxy server name for a web browser request issued by a user device in a network, the user device having a browser configured with the proxy server name and being capable of communicating with the DNS server, the method comprising the steps of:

generating a private Internet Protocol (IP) address in response to a non-resolvable DNS query from the user device, wherein said DNS query is for an IP address associated with said proxy server name;

creating a one-to-one mapping that relates the private IP address to the proxy server name; and identifying the proxy server name from the private IP address using the one-to-one mapping, when the web browser request is issued by the user device, wherein said web browser request will only be resolved by a server corresponding to said private IP address if said web request is a proxy server request to a web proxy server corresponding to said proxy server name for a web page from a second server which is not said web proxy server and said server corresponding to said private IP address, otherwise said server corresponding to said private IP address will reject said web request.

11. The method according to claim 10, wherein the network is a public hot spot network.

12. The method according to claim 10, wherein the network is a guest service network in an enterprise.

13. In a web server, a method for receiving redirected web browser requests issued from a user device in a network, the user device being capable of communicating with the DNS server, the method comprising the steps of:

determining, from a header of a redirected web browser request issued from the user device, whether a browser in the user device has a proxy server configuration;

determining an original destination IP address of the redirected web browser request, the original destination IP address being a private IP address previously associated with the user device in response to a non-resolvable DNS query from the user device; and identifying a proxy server name corresponding to the proxy server configuration from the private IP address, using a one-to-one mapping between the private IP address and the proxy server name, wherein said redirected browser request will only be resolved if said proxy server name can be identified, otherwise said browser requested will be rejected because said web browser request will be determined to be a non-proxy server request.

* * * * *